(12) United States Patent
Kim et al.

(10) Patent No.: US 8,394,734 B2
(45) Date of Patent: Mar. 12, 2013

(54) SOLID CATALYST FOR PROPYLENE POLYMERIZATION AND A METHOD FOR PREPARATION OF POLYPROPYLENE USING THE SAME

(75) Inventors: Sang Yull Kim, Seosan-si (KR); Jin Woo Lee, Seosan-si (KR); Eun Il Kim, Daejeon (KR); Joon Ryeo Park, Seoul (KR)

(73) Assignee: Samsung Total Petrochemicals Co., Ltd., Daesan-up, Seosan-shi, Chungcheongnam-do (KR)

( * ) Notice: Subject to any disclaimer, the term of this patent is extended or adjusted under 35 U.S.C. 154(b) by 0 days.

(21) Appl. No.: 13/457,944

(22) Filed: Apr. 27, 2012

(65) Prior Publication Data

US 2012/0277389 A1 Nov. 1, 2012

(30) Foreign Application Priority Data

Apr. 27, 2011 (KR) ........................ 10-2011-0039563
Nov. 8, 2011 (KR) ........................ 10-2011-0115896

(51) Int. Cl.
*B01J 31/00* (2006.01)
*C08F 4/02* (2006.01)
*C08F 4/44* (2006.01)
*C08F 2/00* (2006.01)

(52) U.S. Cl. ........ 502/125; 502/126; 502/127; 502/150; 502/172; 526/142; 526/213

(58) Field of Classification Search .................. 502/125, 502/126, 127, 150, 170, 172; 526/142, 213
See application file for complete search history.

(56) References Cited

U.S. PATENT DOCUMENTS

| 4,562,173 A | 12/1985 | Terano et al. |
| 4,981,930 A | 1/1991 | Funabashi et al. |
| 2008/0113860 A1 * | 5/2008 | Ernst et al. ................... 502/173 |

FOREIGN PATENT DOCUMENTS

| EP | 0362705 | 4/1990 |
| KR | 0072844 | 1/1994 |
| KR | 0572616 | 4/2006 |

* cited by examiner

*Primary Examiner* — David W Wu
(74) *Attorney, Agent, or Firm* — Young & Thompson

(57) ABSTRACT

Provided are a solid catalyst for propylene polymerization which includes titanium, magnesium, halogen and an internal electron donor mixture of two or more compounds wherein the internal electron donor mixture includes at least one selected from the bicycloalkanes or bicycloalkenes and at least one selected from diethers and succinates, and a method for preparing propylene using the same. As disclosed, it is possible to prepare polypropylene having an excellent stereoregularity with a high production yield.

4 Claims, No Drawings

SOLID CATALYST FOR PROPYLENE POLYMERIZATION AND A METHOD FOR PREPARATION OF POLYPROPYLENE USING THE SAME

TECHNICAL FIELD

The present invention is directed to a solid catalyst for propylene polymerization, which comprises titanium, magnesium, halogen and an internal electron donor mixture of non-aromatic compounds, and a method for preparing polypropylene using the same.

BACKGROUND OF THE INVENTION

Polypropylene has various industrial applications, particularly it is widely applied for materials used in automobiles and electronic products, etc. with various usages. For more expanded applications of polypropylene, an improvement in rigidity which may be led by an increase in the degree of crystallinity is further required as well as a wide molecular weight distribution so as to have improved processability. In order to obtain such properties in polypropylene, it is needed for a solid catalyst for preparing the same to be designed to have high stereoregularity and wide molecular weight distribution.

For polymerization of olefins such as propylene or the like, a solid catalyst comprising magnesium, titanium, an internal electron donor and halogen as essential elements is known in this field of art, and methods for polymerizing or copolymerizing olefins have been proposed many. However, such methods are not satisfying in terms of obtaining polymers having high stereoregularity with a high production yield, and thus needed to be improved in the above aspect.

In order to reduce the production cost by increasing the polymerization activity and improve physical properties of the resulted polymers by improving the catalyst performance such as stereoregularity, it is generally known in this field of art to use diester of aromatic dicarboxylic acid as an internal electron donor and related patent applications have been filed many, for examples, U.S. Pat. No. 4,562,173, U.S. Pat. No. 4,981,930, Korean Patent No. 0072844 and the like. The above patents describe a method for preparing a catalyst showing high activity and stereoregularity by using aromatic dialkyldiesters or aromatic monoalkylmonoesters. However, those aromatic carboxyl ester compounds used in the prior arts of the above-mentioned patents are known as endocrine disruptors which have adverse effect even at very small amount, on human health such as causing problems in fertility or reproductive functions in human, growth disorders, deformation and cancers as well as ecosystem. In this regard, there have been needs for the use of an eco-friendly internal electron donor in preparation of polypropylene which is generally used as a food packaging material. Further, the methods according to the above-mentioned patents cannot provide high stereoregular polymers with a high yield to the satisfying degree and thus further improvements in the methods are needed.

EP 0362705B1 proposes a method for preparing a catalyst using 1,3-diether compounds as an internal electron donor. However, this method is need to be further improved in terms of activity and stereoregularity, and has a relatively small molecular weight distribution thereby not being suitable for the preparation of polypropylene which requires wide molecular weight distribution.

Korean Patent No. 0572616 discloses a preparation method for a catalyst using a non-aromatic compound containing both ketone and ether groups, however stereoregularity and molecular weight distribution still need to be significantly improved.

SUMMARY OF THE INVENTION

The present invention has now been developed to solve the above problems of prior art. Therefore, the purpose of the present invention is to provide a solid catalyst for preparing polypropylene having excellent activity and stereoregularity by using a mixture of specific non-aromatic compounds as an internal electron donor, and a method for preparing polypropylene using the catalyst.

DETAILED DESCRIPTION OF THE INVENTION

In order to achieve the purpose of the present invention, the solid catalyst for propylene polymerization according to the present invention is characterized by comprising titanium, magnesium, halogen and an internal electron donor mixture of two or more compounds wherein the internal electron donor mixture comprises at least one selected from the bicycloalkane dicarboxylates or bicycloalkene dicarboxylates represented by the following formula (II), formula (III), formula (IV) or formula (V) and at least one selected from the diether compounds represented by the following formula (VI) and the succinate compounds represented by the following formula (VII):

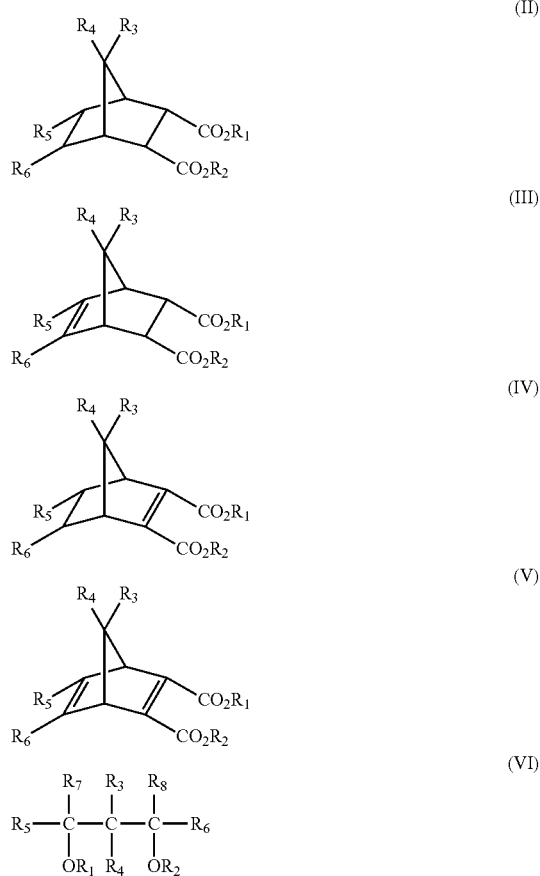

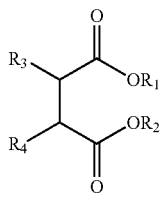

(VII)

wherein, $R_1$ and $R_2$, which may be same or different, are a linear, branched or cyclic C1-20 alkyl, alkenyl, aryl, arylalkyl or alkylaryl group, respectively; $R_3$, $R_4$, $R_5$, $R_6$, $R_7$ and $R_8$, which may be same or different, are hydrogen, a linear, branched or cyclic C1-20 alkyl, alkenyl, aryl, arylalkyl or alkylaryl group, respectively.

As for the bicycloalkane dicarboxylates represented by the formula (II) or bicycloalkene dicarboxylates represented by the formula (III), the formula (IV) and the formula (V), for example the following compounds may be mentioned: bicyclo[2.2.1]heptane-2,3-dicarboxylic acid diethylhexylester, bicyclo[2.2.1]heptane-2,3-dicarboxylic acid dioctylester, bicyclo[2.2.1]heptane-2,3-dicarboxylic acid diisobutylester, bicyclo[2.2.1]heptane-2,3-dicarboxylic acid dibutylester, bicyclo[2.2.1]heptane-2,3-dicarboxylic acid diisopropylester, bicyclo[2.2.1]heptane-2,3-dicarboxylic acid dipropylester, bicyclo[2.2.1]heptane-2,3-dicarboxylic acid diethylester, bicyclo[2.2.1]heptane-2,3-dicarboxylic acid dimethylester, 7,7-dimethylbicyclo[2.2.1]heptane-2,3-dicarboxylic acid diethylhexylester, 7,7-dimethylbicyclo[2.2.1]heptane-2,3-dicarboxylic acid dioctylester, 7,7-dimethylbicyclo[2.2.1]heptane-2,3-dicarboxylic acid diisobutylester, 7,7-dimethylbicyclo[2.2.1]heptane-2,3-dicarboxylic acid dibutylester, 7,7-dimethylbicyclo[2.2.1]heptane-2,3-dicarboxylic acid diisopropylester, 7,7-dimethylbicyclo[2.2.1]heptane-2,3-dicarboxylic acid dipropylester, 7,7-dimethylbicyclo[2.2.1]heptane-2,3-dicarboxylic acid diethylester, 7,7-dimethylbicyclo[2.2.1]heptane-2,3-dicarboxylic acid dimethylester, 5-methylbicyclo[2.2.1]heptane-2,3-dicarboxylic acid diethylhexylester, 5-methylbicyclo[2.2.1]heptane-2,3-dicarboxylic acid dioctylester, 5-methylbicyclo[2.2.1]heptane-2,3-dicarboxylic acid diisobutylester, 5-methylbicyclo[2.2.1]heptane-2,3-dicarboxylic acid dibutylester, 5-methylbicyclo[2.2.1]heptane-2,3-dicarboxylic acid diisopropylester, 5-methylbicyclo[2.2.1]heptane-2,3-dicarboxylic acid dipropylester, 5-methylbicyclo[2.2.1]heptane-2,3-dicarboxylic acid diethylester, 5-methylbicyclo[2.2.1]heptane-2,3-dicarboxylic acid dimethylester, 6-methylbicyclo[2.2.1]heptane-2,3-dicarboxylic acid diethylhexylester, 6-methylbicyclo[2.2.1]heptane-2,3-dicarboxylic acid dioctylester, 6-methylbicyclo[2.2.1]heptane-2,3-dicarboxylic acid diisobutylester, 6-methylbicyclo[2.2.1]heptane-2,3-dicarboxylic acid dibutylester, 6-methylbicyclo[2.2.1]heptane-2,3-dicarboxylic acid diisopropylester, 6-methylbicyclo[2.2.1]heptane-2,3-dicarboxylic acid dipropylester, 6-methylbicyclo[2.2.1]heptane-2,3-dicarboxylic acid diethylester, 6-methylbicyclo[2.2.1]heptane-2,3-dicarboxylic acid dimethylester, 5,6-dimethylbicyclo[2.2.1]heptane-2,3-dicarboxylic acid diethylhexylester, 5,6-dimethylbicyclo[2.2.1]heptane-2,3-dicarboxylic acid dioctylester, 5,6-dimethylbicyclo[2.2.1]heptane-2,3-dicarboxylic acid diisobutylester, 5,6-dimethylbicyclo[2.2.1]heptane-2,3-dicarboxylic acid dibutylester, 5,6-dimethylbicyclo[2.2.1]heptane-2,3-dicarboxylic acid diisopropylester, 5,6-dimethylbicyclo[2.2.1]heptane-2,3-dicarboxylic acid dipropylester, 5,6-dimethylbicyclo[2.2.1]heptane-2,3-dicarboxylic acid diethylester, 5,6-dimethylbicyclo[2.2.1]heptane-2,3-dicarboxylic acid dimethylester, bicyclo[2.2.1]hept-5-ene-2,3-dicarboxylic acid diethylhexylester, bicyclo[2.2.1]hept-5-ene-2,3-dicarboxylic acid dioctylester, bicyclo[2.2.1]hept-5-ene-2,3-dicarboxylic acid diisobutylester, bicyclo[2.2.1]hept-5-ene-2,3-dicarboxylic acid dibutylester, bicyclo[2.2.1]hept-5-ene-2,3-dicarboxylic acid diisopropylester, bicyclo[2.2.1]hept-5-ene-2,3-dicarboxylic acid dipropylester, bicyclo[2.2.1]hept-5-ene-2,3-dicarboxylic acid diethylester, bicyclo[2.2.1]hept-5-ene-2,3-dicarboxylic acid dimethylester, 7,7-dimethylbicyclo[2.2.1]hept-5-ene-2,3-dicarboxylic acid diethylhexylester, 7,7-dimethylbicyclo[2.2.1]hept-5-ene-2,3-dicarboxylic acid dioctylester, 7,7-dimethylbicyclo[2.2.1]hept-5-ene-2,3-dicarboxylic acid diisobutylester, 7,7-dimethylbicyclo[2.2.1]hept-5-ene-2,3-dicarboxylic acid dibutylester, 7,7-dimethylbicyclo[2.2.1]hept-5-ene-2,3-dicarboxylic acid diisopropylester, 7,7-dimethylbicyclo[2.2.1]hept-5-ene-2,3-dicarboxylic acid dipropylester, 7,7-dimethylbicyclo[2.2.1]hept-5-ene-2,3-dicarboxylic acid diethylester, 7,7-dimethylbicyclo[2.2.1]hept-5-ene-2,3-dicarboxylic acid dimethylester, 5-methylbicyclo[2.2.1]hept-5-ene-2,3-dicarboxylic acid diethylhexylester, 5-methylbicyclo[2.2.1]hept-5-ene-2,3-dicarboxylic acid dioctylester, 5-methylbicyclo[2.2.1]hept-5-ene-2,3-dicarboxylic acid diisobutylester, 5-methylbicyclo[2.2.1]hept-5-ene-2,3-dicarboxylic acid dibutylester, 5-methylbicyclo[2.2.1]hept-5-ene-2,3-dicarboxylic acid diisopropylester, 5-methylbicyclo[2.2.1]hept-5-ene-2,3-dicarboxylic acid dipropylester, 5-methylbicyclo[2.2.1]hept-5-ene-2,3-dicarboxylic acid diethylester, 5-methylbicyclo[2.2.1]hept-5-ene-2,3-dicarboxylic acid dimethylester, 6-methylbicyclo[2.2.1]hept-5-ene-2,3-dicarboxylic acid diethylhexylester, 6-methylbicyclo[2.2.1]hept-5-ene-2,3-dicarboxylic acid dioctylester, 6-methylbicyclo[2.2.1]hept-5-ene-2,3-dicarboxylic acid diisobutylester, 6-methylbicyclo[2.2.1]hept-5-ene-2,3-dicarboxylic acid dibutylester, 6-methylbicyclo[2.2.1]hept-5-ene-2,3-dicarboxylic acid diisopropylester, 6-methylbicyclo[2.2.1]hept-5-ene-2,3-dicarboxylic acid dipropylester, 6-methylbicyclo[2.2.1]hept-5-ene-2,3-dicarboxylic acid diethylester, 6-methylbicyclo[2.2.1]hept-5-ene-2,3-dicarboxylic acid dimethylester, 5,6-dimethylbicyclo[2.2.1]hept-5-ene-2,3-dicarboxylic acid diethylhexylester, 5,6-dimethylbicyclo[2.2.1]hept-5-ene-2,3-dicarboxylic acid dioctylester, 5,6-dimethylbicyclo[2.2.1]hept-5-ene-2,3-dicarboxylic acid diisobutylester, 5,6-dimethylbicyclo[2.2.1]hept-5-ene-2,3-dicarboxylic acid dibutylester, 5,6-dimethylbicyclo[2.2.1]hept-5-ene-2,3-dicarboxylic acid diisopropylester, 5,6-dimethylbicyclo[2.2.1]hept-5-ene-2,3-dicarboxylic acid dipropylester, 5,6-dimethylbicyclo[2.2.1]hept-5-ene-2,3-dicarboxylic acid diethylester, 5,6-dimethylbicyclo[2.2.1]hept-5-ene-2,3-dicarboxylic acid dimethylester, bicyclo[2.2.1]hept-2-ene-2,3-dicarboxylic acid diethylhexylester, bicyclo[2.2.1]hept-2-ene-2,3-dicarboxylic acid dioctylester, bicyclo[2.2.1]hept-2-ene-2,3-dicarboxylic acid diisobutylester, bicyclo[2.2.1]hept-2-ene-2,3-dicarboxylic acid dibutylester, bicyclo[2.2.1]hept-2-ene-2,3-dicarboxylic acid diisopropylester, bicyclo[2.2.1]hept-2-ene-2,3-dicarboxylic acid dipropylester, bicyclo[2.2.1]hept-2-ene-2,3-dicarboxylic acid diethylester, bicyclo[2.2.1]hept-2-ene-2,3-dicarboxylic acid dimethylester, 7,7-dimethylbicyclo[2.2.1]hept-2-ene-2,3-dicarboxylic acid diethylhexylester, 7,7-dimethylbicyclo[2.2.1]hept-2-ene-2,3-dicarboxylic acid dioctylester, 7,7-dimethylbicyclo[2.2.1]hept-2-ene-2,3-dicarboxylic acid diisobutylester, 7,7-dimethylbicyclo[2.2.1]hept-2-ene-2,3-dicarboxylic acid dibutylester, 7,7-dimethylbicyclo[2.2.1]hept-2-ene-2,3-dicarboxylic acid diisopropylester, 7,7-dimethylbicyclo[2.2.1]hept-2-ene-2,3-dicarboxylic acid dipropylester, 7,7-dimethylbicyclo[2.2.1]hept-2-ene-2,3-dicarboxylic acid diethylester, 7,7-dimethylbicyclo[2.2.1]hept-2-ene-2,3-dicarboxylic acid dimethylester, 5-methylbicyclo[2.2.1]hept-2-ene-2,3-dicarboxylic acid diethylhexylester, 5-methylbicyclo[2.2.1]hept-2-ene-2,3-dicarboxylic acid dioctylester, 5-methylbicyclo[2.2.1]hept-2-ene-2,3-dicarboxylic acid diisobutylester, 5-methylbicyclo[2.2.1]hept-2-ene-2,3-dicarboxylic acid dibutylester, 5-methylbicyclo[2.2.1]hept-2-ene-2,3-dicarboxylic acid diisopropylester, 5-methylbicyclo[2.2.1]hept-2-ene-2,3-dicarboxylic acid dipropylester, 5-methylbicyclo[2.2.1]hept-2-ene-2,3-dicarboxylic acid diethylester, 5-methylbicyclo[2.2.1]hept-2-ene-2,3-dicarboxylic acid dimethylester, 6-methylbicyclo[2.2.1]hept-2-ene-2,3-dicarboxylic acid diethylhexylester, 6-methylbicyclo[2.2.1]hept-2-ene-2,3-dicarboxylic acid dioctylester, 6-methylbicyclo[2.2.1]hept-2-ene-2,3-dicarboxylic acid diisobutylester, 6-methylbicyclo[2.2.1]hept-2-ene-2,3-dicarboxylic acid dibutylester, 6-methylbicyclo[2.2.1]hept-2-ene-2,3-dicarboxylic acid diisopropylester, 6-methylbicyclo[2.2.1]hept-2-ene-2,3-dicarboxylic acid dipropylester, 6-methylbicyclo[2.2.1]hept-2-ene-2,3-dicarboxylic acid diethylester, 6-methylbicyclo[2.2.1]hept-2-ene-2,3-dicarboxylic acid dimethylester, 5,6-dimethylbicyclo[2.2.1]hept-2-ene-2,3-dicarboxylic acid diethylhexylester, 5,6-dimethylbicyclo[2.2.1]hept-2-ene-2,3-dicarboxylic acid dioctylester, 5,6-dimethylbicyclo[2.2.1]hept-2-ene-2,3-dicarboxylic acid dimethylester, 5,6-dimethylbicyclo[2.2.1]hept-2-ene-2,3-dicarboxylic acid dibutylester, 5,6-dimethylbicyclo[2.2.1]hept-2-ene-2,3-dicarboxylic acid diisopropylester, 5,6-dimethylbicyclo[2.2.1]hept-2-ene-2,3-dicarboxylic acid dipropylester, 5,6-dimethylbicyclo[2.2.1]hept-2-ene-2,3-dicarboxylic acid diethylester, 5,6-dimethylbicyclo[2.2.1]hept-2-ene-2,3-dicarboxylic acid dimethylester, bicyclo[2.2.1]hept-2,5-diene-2,3-dicarboxylic acid diethylhexylester, bicyclo[2.2.1]hept-2,5-diene-2,3-dicarboxylic acid dioctylester, bicyclo[2.2.1]hept-2,5-diene-2,3-dicarboxylic acid diisobutylester, bicyclo[2.2.1]hept-2,5-diene-2,3-dicarboxylic acid dibutylester, bicyclo[2.2.1]hept-2,5-diene-2,3-dicarboxylic acid diisopropylester, bicyclo[2.2.1]hept-2,5-diene-2,3-dicarboxylic acid dipropylester, bicyclo[2.2.1]hept-2,5-diene-2,3-dicarboxylic acid diethylester, bicyclo[2.2.1]hept-2,5-diene-2,3-dicarboxylic acid dimethylester, 7,7-dimethylbicyclo[2.2.1]hept-2,5-diene-2,3-dicarboxylic acid diethylhexylester, 7,7-dimethylbicyclo[2.2.1]hept-2,5-diene-2,3-dicarboxylic acid dioctylester, 7,7-dimethylbicyclo[2.2.1]hept-2,5-diene-2,3-dicarboxylic acid diisobutylester, 7,7-dimethylbicyclo[2.2.1]hept-2,5-diene-2,3-dicarboxylic acid dibutylester, 7,7-dimethylbicyclo[2.2.1]hept-2,5-diene-2,3-dicarboxylic acid diisopropylester, 7,7-dimethylbicyclo[2.2.1]hept-2,5-diene-2,3-dicarboxylic acid dipropylester, 7,7-dimethylbicyclo[2.2.1]hept-2,5-diene-2,3-dicarboxylic acid diethylester, 7,7-dimethylbicyclo[2.2.1]hept-2,5-diene-2,3-dicarboxylic acid dimethylester, 5-methylbicyclo[2.2.1]hept-2,5-diene-2,3-dicarboxylic acid diethylhexylester, 5-methylbicyclo[2.2.1]hept-2,5-diene-2,3-dicarboxylic acid dioctylester, 5-methylbicyclo[2.2.1]hept-2,5-diene-2,3-dicarboxylic acid diisobutylester, 5-methylbicyclo[2.2.1]hept-2,5-diene-2,3-dicarboxylic acid dibutylester, 5-methylbicyclo[2.2.1]hept-2,5-diene-2,3-dicarboxylic acid diisopropylester, 5-methylbicyclo[2.2.1]hept-2,5-diene-2,3-dicarboxylic acid dipropylester, 5-methylbicyclo[2.2.1]hept-2,5-diene-2,3-dicarboxylic acid diethylester, 5-methylbicyclo[2.2.1]hept-2,5-diene-2,3-dicarboxylic acid dimethylester, 6-methylbicyclo[2.2.1]hept-2,5-diene-2,3-dicarboxylic acid diethylhexylester, 6-methylbicyclo[2.2.1]hept-2,5-diene-2,3-dicarboxylic acid dioctylester, 6-methylbicyclo[2.2.1]hept-2,5-diene-2,3-dicarboxylic acid diisobutylester, 6-methylbicyclo[2.2.1]hept-2,5-diene-2,3-dicarboxylic acid dibutylester, 6-methylbicyclo[2.2.1]hept-2,5-diene-2,3-dicarboxylic acid diisopropylester, 6-methylbicyclo[2.2.1]hept-2,5-diene-2,3-dicarboxylic acid dipropylester, 6-methylbicyclo[2.2.1]hept-2,5-diene-2,3-dicarboxylic acid diethylester, 6-methylbicyclo[2.2.1]hept-2,5-diene-2,3-dicarboxylic acid dimethylester, 5,6-dimethylbicyclo[2.2.1]hept-2,5-diene-2,3-dicarboxylic acid diethylhexylester, 5,6-dimethylbicyclo[2.2.1]hept-2,5-diene-2,3-dicarboxylic acid dioctylester, 5,6-dimethylbicyclo[2.2.1]hept-2,5-diene-2,3-dicarboxylic acid diisobutylester, 5,6-dimethylbicyclo[2.2.1]hept-2,5-diene-2,3-dicarboxylic acid dibutylester, 5,6-dimethylbicyclo[2.2.1]hept-2,5-diene-2,3-dicarboxylic acid diisopropylester, 5,6-dimethylbicyclo[2.2.1]hept-2,5-diene-2,3-dicarboxylic acid dipropylester, 5,6-dimethylbicyclo[2.2.1]hept-2,5-diene-2,3-dicarboxylic acid diethylester, 5,6-dimethylbicyclo[2.2.1]hept-2,5-diene-2,3-dicarboxylic acid dimethylester and the like.

As for the diether compounds represented by the formula (VI), for example, the following compounds can be mentioned: 9,9-bis(methoxymethyl)fluorene, 2,2-dimethyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-dipentyl-1,3-dimethoxypropane, 2,2-dihexyl-1,3-dimethoxypropane, 2,2-diisopropyl-1,3-dimethoxypropane, 2,2-diisobutyl-1,3-dimethoxypropane, 2,2-dicyclopentyl-1,3-dimethoxypropane, 2,2-dicyclohexyl-1,3-dimethoxypropane, 2-methyl-2-ethyl-1,3-dimethoxypropane, 2-methyl-2-propyl-1,3-dimethoxypropane, 2-methyl-2-butyl-1,3-dimethoxypropane, 2-methyl-2-pentyl-1,3-dimethoxypropane, 2-methyl-2-hexyl-1,3-dimethoxypropane, 2-methyl-2-isopropyl-1,3-dimethoxypropane, 2-methyl-2-isobuyl-1,3-dimethoxypropane, 2-methyl-2-cyclopentyl-1,3-dimethoxypropane, 2-methyl-2-cyclohexyl-1,3-dimethoxypropane, 2-ethyl-2-propyl-1,3-dimethoxypropane, 2-ethyl-2-butyl-1,3-dimethoxypropane, 2-ethyl-2-pentyl-1,3-dimethoxypropane, 2-ethyl-2-hexyl-1,3-dimethoxypropane, 2-ethyl-2-isopropyl-1,3-dimethoxypropane, 2-ethyl-2-isobuyl-1,3-dimethoxypropane, 2-ethyl-2-cyclopentyl-1,3-dimethoxypropane, 2-ethyl-2-cyclohexyl-1,3-dimethoxypropane, 2-propyl-2-butyl-1,3-dimethoxypropane, 2-propyl-2-pentyl-1,3-dimethoxypropane, 2-propyl-2-hexyl-1,3-dimethoxypropane, 2-propyl-2-isopropyl-1,3-dimethoxypropane, 2-propyl-2-isobuyl-1,3-dimethoxypropane, 2-propyl-2-cyclopentyl-1,3-dimethoxypropane, 2-propyl-2-cyclohexyl-1,3-dimethoxypropane, 2-butyl-2-pentyl-1,3-dimethoxypropane, 2-butyl-2-hexyl-1,3-dimethoxypropane, 2-butyl-2-isopropyl-1,3-dimethoxypropane, 2-butyl-2-isobuyl-1,3-dimethoxypropane, 2-butyl-2-cyclopentyl-1,3-dimethoxypropane, 2-butyl-2-cyclohexyl-1,3-dimethoxypropane, 2-pentyl-2-hexyl-1,3-dimethoxypropane, 2-pentyl-2-isopropyl-1,3-dimethoxypropane, 2-pentyl-2-isobuyl-1,3-dimethoxypropane, 2-pentyl-2-cyclopentyl-1,3-dimethoxypropane, 2-pentyl-2-cyclohexyl-1,3-dimethoxypropane, 2-hexyl-2-isopropyl-1,3-dimethoxypropane, 2-hexyl-2-isobuyl-1,3-dimethoxypropane, 2-hexyl-2-cyclopentyl-1,3-dimethoxypropane, 2-hexyl-2-cyclohexyl-1,3-dimethoxypropane, 2-isopropyl-2-isobuyl-1,3-dimethoxypropane, 2-isopropyl-2-cyclopentyl-1,3-dimethoxypropane, 2-isopropyl-2-cyclohexyl-1,3-dimethoxypropane, 2-isobuyl-2-cyclopentyl-1,3-dimethoxypropane, 2-isobuyl-2-cyclohexyl-1,3-dimethoxypropane, 2-cyclopentyl-2-cyclohexyl-1,3-dimethoxypropane, 9,9-bis(ethoxymethyl)fluorene, 2,2- dimethyl-1,3-diethoxypropane, 2,2-diethyl-1,3-diethoxypropane, 2,2-dipropyl-1,3-diethoxypropane, 2,2-dibutyl-1,3-diethoxypropane, 2,2-dipentyl-1,3-diethoxypropane, 2,2-dihexyl-1,3-diethoxypropane, 2,2-diisopropyl-1,3-diethoxypropane, 2,2-diisobutyl-1,3-diethoxypropane, 2,2-dicyclopentyl-1,3-diethoxypropane, 2,2-dicyclohexyl-1,3-diethoxypropane, 2-methyl-2-ethyl-1,3-diethoxypropane, 2-methyl-2-propyl-1,3-diethoxypropane, 2-methyl-2-butyl-1,3-diethoxypropane, 2-methyl-2-pentyl-1,3-diethoxypropane, 2-methyl-2-hexyl-1,3-diethoxypropane, 2-methyl-2-isopropyl-1,3-diethoxypropane, 2-methyl-2-isobuyl-1,3-diethoxypropane, 2-methyl-2-cyclopentyl-1,3-diethoxypropane, 2-methyl-2-cyclohexyl-1,3-diethoxypropane, 2-ethyl-2-propyl-1,3-diethoxypropane, 2-ethyl-2-butyl-1,3-diethoxypropane, 2-ethyl-2-pentyl-1,3-diethoxypropane, 2-ethyl-2-hexyl-1,3-diethoxypropane, 2-ethyl-2-isopropyl-1,3-diethoxypropane, 2-ethyl-2-isobuyl-1,3-diethoxypropane, 2-ethyl-2-cyclopentyl-1,3-diethoxypropane, 2-ethyl-2-cyclohexyl-1,3-diethoxypropane, 2-propyl-2-butyl-1,3-diethoxypropane, 2-propyl-2-pentyl-1,3-diethoxypropane, 2-propyl-2-hexyl-1,3-diethoxypropane, 2-propyl-2-isopropyl-1,3-diethoxypropane, 2-propyl-2-isobuyl-1,3-diethoxypropane, 2-propyl-2-cyclopentyl-1,3-diethoxypropane, 2-propyl-2-cyclohexyl-1,3-diethoxypropane, 2-butyl-2-pentyl-1,3-diethoxypropane, 2-butyl-2-hexyl-1,3-diethoxypropane, 2-butyl-2-isopropyl-1,3-diethoxypropane, 2-butyl-2-isobuyl-1,3-diethoxypropane, 2-butyl-2-cyclopentyl-1,3-diethoxypropane, 2-butyl-2-cyclohexyl-1,3-diethoxypropane, 2-pentyl-2-hexyl-1,3-diethoxypropane, 2-pentyl-2-isopropyl-1,3-diethoxypropane, 2-pentyl-2-isobuyl-1,3-diethoxypropane, 2-pentyl-2-cyclopentyl-1,3-diethoxypropane, 2-pentyl-2-cyclohexyl-1,3-diethoxypropane, 2-hexyl-2-isopropyl-1,3-diethoxypropane, 2-hexyl-2-isobuyl-1,3-diethoxypropane, 2-hexyl-2-cyclopentyl-1,3-diethoxypropane, 2-hexyl-2-cyclohexyl-1,3-diethoxypropane, 2-isopropyl-2-isobuyl-1,3-diethoxypropane, 2-isopropyl-2-cyclopentyl-1,3-diethoxypropane, 2-isopropyl-2-cyclohexyl-1,3-diethoxypropane, 2-isobuyl-2-cyclopentyl-1,3-diethoxypropane, 2-isobuyl-2-cyclohexyl-1,3-diethoxypropane, 2-cyclopentyl-2-cyclohexyl-1,3-diethoxypropane and the like.

As for the succinate compounds represented, by the formula (VII), for example, the following compounds may be mentioned: diethyl-2,3-dimethylsuccinate, diethyl-2,3-diethylsuccinate, diethyl-2,3-dipropylsuccinate, diethyl-2,3-diisopropylsuccinate, diethyl-2,3-dibutylsuccinate, diethyl-2,3-diisobutylsuccinate, diethyl-2,3-dipentylsuccinate, diethyl-2,3-dihexylsuccinate, diethyl-2,3-dicyclopentylsuccinate, diethyl-2,3-dicyclohexylsuccinate, diethyl-2-cyclopentyl-3-methylsuccinate, diethyl-2-cyclohexyl-3-methylsuccinate, diethyl-2-isopropyl-3-methylsuccinate, diethyl-2-isobuyl-3-methylsuccinate, diethyl-2-cyclopentyl-3-ethylsuccinate, diethyl-2-cyclohexyl-3-ethylsuccinate, diethyl-2-isopropyl-3-ethylsuccinate, diethyl-2-isobuyl-3-ethylsuccinate, diethyl-2-cyclopentyl-3-propylsuccinate, diethyl-2-cyclohexyl-3-propylsuccinate, diethyl-2-isopropyl-3-propylsuccinate, diethyl-2-isobuyl-3-propylsuccinate, diethyl-2-cyclopentyl-3-isopropylsuccinate, diethyl-2-cyclohexyl-3-isopropylsuccinate, diethyl-2-isobuyl-3-isopropylsuccinate, diethyl-2-cyclopentyl-3-isobutylsuccinate, diethyl-2-cyclohexyl-3-isobutylsuccinate, diethyl-2-isopropyl-3-isobutylsuccinate, diethyl-2,3-dimethylidenesuccinate, diethyl-2,3-diethylidenesuccinate, diethyl-2,3-dipropylidenesuccinate, diethyl-2,3-diisopropylidenesuccinate, diethyl-2,3-dibutylidenesuccinate, diethyl-2,3-diisobutylidenesuccinate, diethyl-2,3-dipentylidenesuccinate, diethyl-2,3-dihexylidenesuccinate, diethyl-2,3-dicyclopentylidenesuccinate, diethyl-2,3-dicyclohexylidenesuccinate, diethyl-2-cyclopentyl-3-methylidenesuccinate, diethyl-2-cyclohexyl-3-methylidenesuccinate, diethyl-2-isopropyl-3-methylidenesuccinate, diethyl-2-isobuyl-3-methylidenesuccinate, diethyl-2-cyclopentyl-3-ethylidenesuccinate, diethyl-2-cyclohexyl-3-ethylidenesuccinate, diethyl-2-isopropyl-3-ethylidenesuccinate, diethyl-2-isobuyl-3-ethylidenesuccinate, diethyl-2-cyclopentyl-3-propylidenesuccinate, diethyl-2-cyclohexyl-3-propylidenesuccinate, diethyl-2-isopropyl-3-propylidenesuccinate, diethyl-2-isobuyl-3-propylidenesuccinate, diethyl-2-cyclopentyl-3-isopropylidenesuccinate, diethyl-2-cyclohexyl-3-isopropylidenesuccinate, diethyl-2-isobuyl-3-isopropylidenesuccinate, diethyl-2-cyclopentyl-3-isobutylidenesuccinate, diethyl-2-cyclohexyl-3-isobutylidenesuccinate, diethyl-2-isopropyl-3-isobutylidenesuccinate, diethyl-2-cyclopentylidene-3-methylsuccinate, diethyl-2-cyclohexylidene-3-methylsuccinate, diethyl-2-isopropylidene-3-methylsuccinate, diethyl-2-isobutylidene-3-methylsuccinate, diethyl-2-cyclopentylidene-3-ethylsuccinate, diethyl-2-cyclohexylidene-3-ethylsuccinate, diethyl-2-isopropylidene-3-ethylsuccinate, diethyl-2-isobutylidene-3-ethylsuccinate, diethyl-2-cyclopentylidene-3-propylsuccinate, diethyl-2-cyclohexylidene-3-propylsuccinate, diethyl-2-isopropylidene-3-propylsuccinate, diethyl-2-isobutylidene-3-propylsuccinate, diethyl-2-cyclopentylidene-3-isopropylsuccinate, diethyl-2-cyclohexylidene-3-isopropylsuccinate, diethyl-2-isobutylidene-3-isopropylsuccinate, diethyl-2-cyclopentylidene-3-isobutylsuccinate, diethyl-2-cyclohexylidene-3-isobutylsuccinate, diethyl-2-isopropylidene-3-isobutyl succinate, dibutyl-2,3-dimethylsuccinate, dibutyl-2,3-diethylsuccinate, dibutyl-2,3-dipropylsuccinate, dibutyl-2,3-diisopropylsuccinate, dibutyl-2,3-dibutylsuccinate, dibutyl-2,3-diisobutylsuccinate, dibutyl-2,3-dipentylsuccinate, dibutyl-2,3-dihexylsuccinate, dibutyl-2,3-dicyclopentylsuccinate, dibutyl-2,3-dicyclohexylsuccinate, dibutyl-2-cyclopentyl-3-methylsuccinate, dibutyl-2-cyclohexyl-3-methylsuccinate, dibutyl-2-isopropyl-3-methylsuccinate, dibutyl-2-isobuyl-3-methylsuccinate, dibutyl-2-cyclopentyl-3-ethylsuccinate, dibutyl-2-cyclohexyl-3-ethylsuccinate, dibutyl-2-isopropyl-3-ethylsuccinate, dibutyl-2-isobuyl-3-ethylsuccinate, dibutyl-2-cyclopentyl-3-propylsuccinate, dibutyl-2-cyclohexyl-3-propylsuccinate, dibutyl-2-isopropyl-3-propylsuccinate, dibutyl-2-isobuyl-3-propylsuccinate, dibutyl-2-cyclopentyl-3-isopropylsuccinate, dibutyl-2-cyclohexyl-3-isopropylsuccinate, dibutyl-2-isobuyl-3-isopropylsuccinate, dibutyl-2-cyclopentyl-3-isobutylsuccinate, dibutyl-2-cyclohexyl-3-isobutylsuccinate, dibutyl-2-isopropyl-3-isobutyl succinate, dibutyl-2,3-dimethylidenesuccinate, dibutyl-2,3-diethylidenesuccinate, dibutyl-2,3-dipropylidenesuccinate, dibutyl-2,3-diisopropylidenesuccinate, dibutyl-2,3-dibutylidenesuccinate, dibutyl-2,3-diisobutylidenesuccinate, dibutyl-2,3-dipentylidenesuccinate, dibutyl-2,3-dihexylidenesuccinate, dibutyl-2,3-dicyclopentylidenesuccinate, dibutyl-2,3-dicyclohexylidenesuccinate, dibutyl-2-cyclopentyl-3-methylidenesuccinate, dibutyl-2-cyclohexyl-3-methylidenesuccinate, dibutyl-2-isopropyl-3-methylidenesuccinate, dibutyl-2-isobuyl-3-methylidenesuccinate, dibutyl-2-cyclopentyl-3-ethylidenesuccinate, dibutyl-2-cyclohexyl-3-ethylidenesuccinate, dibutyl-2-isopropyl-3-ethylidenesuccinate, dibutyl-2-isobuyl-3-ethylidenesuccinate, dibutyl-2-cyclopentyl-3-propylidenesuccinate, dibutyl-2-cyclohexyl-3- propylidenesuccinate, dibutyl-2-isopropyl-3-propylidenesuccinate, dibutyl-2-isobuyl-3-propylidenesuccinate, dibutyl-2-cyclopentyl-3-isopropylidenesuccinate, dibutyl-2-cyclohexyl-3-isopropylidenesuccinate, dibutyl-2-isobuyl-3-isopropylidenesuccinate, dibutyl-2-cyclopentyl-3-isobutylidenesuccinate, dibutyl-2-cyclohexyl-3-isobutylidenesuccinate, dibutyl-2-isopropyl-3-isobutylidene succinate, dibutyl-2-cyclopentylidene-3-methylsuccinate, dibutyl-2-cyclohexylidene-3-methylsuccinate, dibutyl-2-isopropylidene-3-methylsuccinate, dibutyl-2-isobutylidene-3-methylsuccinate, dibutyl-2-cyclopentylidene-3-ethylsuccinate, dibutyl-2-cyclohexylidene-3-ethylsuccinate, dibutyl-2-isopropylidene-3-ethylsuccinate, dibutyl-2-isobutylidene-3-ethylsuccinate, dibutyl-2-cyclopentylidene-3-propylsuccinate, dibutyl-2-cyclohexylidene-3-propylsuccinate, dibutyl-2-isopropylidene-3-propylsuccinate, dibutyl-2-isobutylidene-3-propylsuccinate, dibutyl-2-cyclopentylidene-3-isopropylsuccinate, dibutyl-2-cyclohexylidene-3-isopropylsuccinate, dibutyl-2-isobutylidene-3-isopropylsuccinate, dibutyl-2-cyclopentylidene-3-isobutylsuccinate, dibutyl-2-cyclohexylidene-3-isobutylsuccinate, dibutyl-2-isopropylidene-3-isobutylsuccinate and the like.

The solid catalyst according to the present invention may be preferably prepared by a method comprising the following steps:
(1) a step of reacting dialkoxy magnesium with titanium halide in the presence of an organic solvent;
(2) a step of, with increasing the temperature to the range of 60-150° C., adding two or more electron donors to the product resulted from the above step (1) and reacting them together, wherein the internal electron donors comprises at least one selected from the bicycloalkane dicarboxylates or bicycloalkene dicarboxylates represented by the following formula (II), formula (III), formula (IV) or formula (V), and at least one selected from the diether compounds represented by the following formula (VI) and the succinate compounds represented by the following formula (VII); and
(3) a step of reacting the product obtained from the above step (2) with titanium halide at the temperature of 0-150° C. and washing the resulted product.

Although the organic solvent used in the above step (1) is not specifically limited, preferably used may be C6-12 aliphatic, aromatic or halogenated hydrocarbons, more preferably C7-10 saturated aliphatic, aromatic or halogenated hydrocarbons, and for example, at least one selected from the group consisting of octane, nonane, decane, toluene and xylene, chlorobutane, chlorohexane, chloroheptane or the like may be used alone or as a mixture.

The dialkoxymagnesium used in the above step (1) which is obtained by reacting metal magnesium with an alcohol anhydride in the presence of magnesium chloride is spherical particles having an average particle diameter of 10-200 μm with a smooth surface, and the spherical particle shape is preferably remained as it is even during propylene polymerization. When the average particle size is less than 10 μm, an increased amount of microparticles are present in the resulted catalysts and when it is more than 200 μm, bulk density is likely to be smaller, disadvantageously. As for the dialkoxymagnesium, particularly diethoxymagnesium is preferred.

The ratio of the organic solvent to dialkoxymagnesium, i.e. dialkoxymagnesium (weight):organic solvent (volume) is preferably 1:5-50, more preferably 1:7-20. When the ratio of is less than 1:5, viscosity of the slurry becomes rapidly increased thereby hindering homogeneous stirring, and when it is more than 1:50, the bulk density of the resulted carrier is significantly reduced or the particle surface becomes rough, disadvantageously.

The titanium halides used in the above step (1) of the process for preparing a solid catalyst according to the present invention may be preferably represented as the following formula (I):

$$Ti(OR)_aX_{(4-a)} \quad (I)$$

wherein, R is a C1-10 alkyl group; X is halogen; a is an integer of 0-3 for the atomic valence in the above formula (I). Particularly, titanium tetrachloride is preferably used.

The step (1) of the process for preparing a solid catalyst is preferably carried out by gradually adding titanium halide at a temperature range of −20° C.-50° C.

The amount of titanium halide used in the above step (1) is preferably 0.1-10 moles, more preferably 0.3-2 moles, based on 1 mole of dialkoxymagnesium. When the amount is less than 0.1 mole, the conversion of dialkoxymagnesium to magnesium chloride does not smoothly proceed, and when the amount is more than 10 moles, an excessive amount of titanium components are present in the resulted catalyst, disadvantageously.

The above step (2) is preferably carried out by while gradually increasing the temperature of the product resulted from the step (1) to the range of 60-150° C., preferably 80-130° C., adding an internal electron donor mixture thereto and allowing for them to react for 1-3 hours. When the temperature is less than 60° C. or the reaction time is less than 1 hour, the reaction can be hardly completed, and when the temperature is more than 150° C. or the reaction time is more than 3 hours, a side-reaction which may occur may lower the polymerization activity or stereospecificity of the resulted catalyst.

The temperature or the number of addition of the internal electron donor, as long as it is added during the temperature increase process, is not specifically limited, and the total amount of the internal electron donor used is preferably 0.1-1.0 mole based on 1 mole of diethoxymagnesium. When the amount is out of said range, the polymerization activity or stereospecificity of the resulted catalyst may be decreased disadvantageously.

The step (3) of the catalyst preparation process according to the present invention is a process in which the product resulted from the above step (2) is secondarily reacted with titanium halide at the temperature range of 60-150° C., preferably 80-130° C. The examples of titanium halide used in this step may include titanium halide having the above general formula (I).

The reactions at each step of the above solid catalyst preparation method are preferably carried out in a reactor equipped with a stirrer from which moisture was sufficiently removed, under nitrogen atmosphere.

The solid catalyst prepared by the above method of the present invention is formed by comprising magnesium, titanium, halogen, silicon and an internal electron donor mixture, and preferably comprising magnesium 5-40 wt %, titanium 0.5-10 wt %, halogen 50-85 wt % and an internal electron donor mixture 2.5-30 wt % in terms of the catalyst activity.

The solid catalyst of the present invention may be suitably used in polypropylene preparation, and the method for polypropylene preparation using the solid catalyst obtained by the present invention comprises polymerization of propylene or co-polymerization of propylene with other alpha-olefins at the presence of the solid catalyst, a cocatalyst and an external electron donor.

The solid catalyst may be prepolymerized with ethylene or alpha-olefins before being used as a component of a polymerization reaction.

The prepolymerization reaction may be carried out at a sufficiently low temperature under the pressure of ethylene or alpha-olefin, at the presence of hydrocarbon solvent such as hexane, said catalyst component and organoaluminum compound such as triethylaluminum. The prepolymerization by which catalyst particles are surrounded by polymers so as to maintain the catalyst shape, helps improve the polymer morphology after polymerization. The weight ratio of polymers/catalyst after completion of prepolymerization is preferably about 0.1-20:1.

As a cocatalyst component for the polypropylene preparation method of the present invention, organometallic compounds belonging to Group II or III of the Periodic table of element may be used, for example alkylaluminum compounds are preferably used. The alkylaluminum compounds are represented by the following formula (III):

$$AlR_3 \quad (III)$$

wherein, R is a C1-8 alkyl group.

As for the specific examples of such alkylaluminum compounds, trimethylaluminum, triethylaluminum, tripropylaluminum, tributylaluminum, triisobutylaluminum and trioctylaluminum or the like may be mentioned.

The ratio of the cocatalyst to the solid catalyst component may be varied depending on a polymerization method used, however the molar ratio of the metal element of the cocatalyst to the titanium element in the solid catalyst component is preferably the range of 1-1000 and more preferably the range of 10-300. When the molar ratio of the metal element, for example such as aluminum in the cocatalyst to the titanium element in the solid catalyst component is out of said range of 1-1000, the polymerization activity is significantly degraded, disadvantageously.

As for the outer electron donor used in the method for preparing polypropylene according to the present invention, one type of alkoxy silane compounds represented by the following formula (IV) may be used:

$$R^1_m R^2_n Si(OR^3)_{(4-m-n)} \quad (IV)$$

wherein, $R^1$ and $R^2$, which may be same or different, is linear or branched C1-12 cyclic alkyl or aryl group; $R^3$ is linear or branched, C1-6 alkyl group; m and n is respectively, 0 or 1; and m+n is 1 or 2.

Specific examples of the external electron donor include the following compounds, and it may be used alone or as a mixture of one or more: n-propyltrimethoxysilane, di-n-propyldimethoxysilane, isopropyltrimethoxysilane, diisopropyldimethoxysilane, n-butyltrimethoxysilane, di-n-butyldimethoxysilane, isobutyltrimethoxysilane, diisobutyldimethoxysilane, tert-butyltrimethoxysilane, di-tert-butyldimethoxysilane, n-pentyltrimethoxysilane, di-n-pentyldimethoxysilane, cyclopentyltrimethoxysilane, dicyclopentyldimethoxysilane, cyclopentylmethyldimethoxysilane, cyclopentylethyldimethoxysilane, cyclopentylpropyldimethoxysilane, cyclohexyltrimethoxysilane, dicyclohexyldimethoxysilane, cyclohexylmethyldimethoxysilane, cyclohexylethyldimethoxysilane, cyclohexylpropyldimethoxysilane, cycloheptyltrimethoxysilane, dicycloheptyldimethoxysilane, cycloheptylmethyldimethoxysilane, cycloheptylethyldimethoxysilane, cycloheptylpropyldimethoxysilane, penyltrimethoxysilane, dipenyldimethoxysilane, penylmethyldimethoxysilane, penylethyldimethoxysilane, penylpropyldimethoxysilane, n-propyltriethoxysilane, di-n-propyldiethylxysilane, isopropyltriethylxysilane, diisopropyldiethylxysilane, n-butyltriethylxysilane, di-n-butyldiethylxysilane, isobutyltriethylxysilane, diisobutyldiethylxysilane, tert-butyltriethylxysilane, di-tert-butyldiethylxysilane, n-pentyltriethylxysilane, di-n-pentyldiethylxysilane, cyclopentyltriethylxysilane, dicyclopentyldiethylxysilane, cyclopentylmethyldiethylxysilane, cyclopentylethyldiethylxysilane, cyclopentylpropyldiethylxysilane, cyclohexyltriethylxysilane, dicyclohexyldiethylxysilane, cyclohexylmethyldiethylxysilane, cyclohexylethyldiethylxysilane, cyclohexylpropyldiethylxysilane, cycloheptyltriethylxysilane, dicycloheptyldiethylxysilane, cycloheptylmethyldiethylxysilane, cycloheptylethyldiethylxysilane, cycloheptylpropyldiethylxysilane, penyltriethylxysilane, di-penyldiethylxysilane, penylmethyldiethylxysilane, penylethyldiethylxysilane, penylpropyldiethylxysilane or the like.

The amount of external electron donor may be slightly varied depending on the polymerization method applied thereto, however the molar ratio of the silicon atom in the external electron donor based on the titanium atom in the catalyst component is preferably in the range of 0.1-500 moles and more preferably 1-100. When the molar ratio of the silicon atom in the external electron donor to the titanium atom in the catalyst component is less than 0.1, stereoregularity of the propylene polymer is significantly lowered, disadvantageously, and when it is more than 500, polymerization activity of the catalyst is significantly decreased.

During the propylene polymerization or copolymerization reaction, the polymerization temperature is preferably 20-120° C. When the polymerization temperature is less than 20° C., the polymerization reaction cannot sufficiently proceed, and when it is more than 120° C., the activity is considerably lowered and the physical properties of the resulted polymers is degraded, disadvantageously.

EXAMPLES

Hereinafter, the present invention is further described through the following example, in detail. However, it should be understood that the examples are only provided on illustrative purposes without any intention to limit the scope of the present invention.

Example 1

1. Preparation of Solid Catalyst

To a 1 L-volume glass reactor of which atmosphere was sufficiently substituted by nitrogen, equipped with a stirrer, 150 ml of toluene and 15 g of spherical-shaped diethoxymagnesium having an average particle size of 20 μm, particle distribution index of 0.86, bulk density of 0.35 g/cc were added, then 30 ml of titanium tetrachloride diluted in 45 ml toluene was added thereto over 1 hour while maintaining the temperature at 10° C., and then thereto a mixture of bicycle [2.2.1]hept-2-ene-dicarboxylic acid dibutylester 2.5 g and 9,9-bis(methoxymethyl)fluorene 2.1 g was added while increasing the reactor temperature to 110° C. After maintaining the temperature at 110° C. for 2 hours and lowering to 90° C., stirring was halted, the supernatant was removed, and the resultant was washed once with additional 200 ml toluene. Thereto, 120 ml toluene and 30 ml titanium tetrachloride were added, and the temperature was raised to 110° C. and maintained for 2 hours for aging. After completion of the aging process, the mixed slurry was washed twice with 200 ml toluene for each washing, and then washed 5 times at 40° C. with 200 ml n-hexane for each washing, thereby obtaining a pale yellow solid catalyst component. The obtained catalyst component was dried for 18 hours under a nitrogen stream, and the titanium content in the resulted solid catalyst component was 2.3 wt %.

2. Polypropylene Polymerization

Into a 4 L-volume high-pressure stainless reactor, 10 mg of thus obtained solid catalyst, 6.6 mmol of triethylaluminum and 0.66 mmol of cyclohexylmethyldimethoxysilane were added. Next, 1000 ml of hydrogen and 2.4 L of liquid propylene were added in this order and polymerization was carried out at an elevated temperature of 70° C. After 2 hours from the start of polymerization, the remaining propylene inside the reactor was completely removed by opening the valve, while lowering the reactor temperature to room temperature.

Analysis of thus resulted polymer was carried out and the results were represented in Table 1.

The catalyst activity and stereoregualrity were determined by the following method.
① Catalyst activity (kg-PP/g-cat)=the amount of polymers produced (kg)÷the amount of catalyst used (g)
② Stereregularity (X.I.): the amount of insolubles crystallized and precipitated in mixed xylene solvent (wt %)

Example 2

A catalyst was prepared according to the method described in Example 1 except that a mixture of bicycle[2.2.1]hetane-2,3-dicarboxylic acid dibutylester 2.5 g and 9,9-bis(methoxymethyl)fluorene 2.1 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.2 wt %. Next, propylene polymerization was carried out by the same method as in Example 1, and the result was represented in Table 1.

Example 3

A catalyst was prepared according to the method described in Example 1 except that a mixture of bicycle[2.2.1]hept-2,5-diene-dicarboxylic acid dibutylester 2.5 g and 9,9-bis(methoxymethyl)fluorene 2.1 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.5 wt %. Next, propylene polymerization was carried out by the same method as in Example 1, and the result was represented in Table 1.

Example 4

A catalyst was prepared according to the method described in Example 1 except that a mixture of bicycle[2.2.1]hept-5-ene-dicarboxylic acid dibutylester 2.5 g and 9,9-bis(mechoxymethyl)fluorene 2.1 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.2 wt %. Next, propylene polymerization was carried out by the same method as in Example 1, and the result was represented in Table 1.

Example 5

A catalyst was prepared according to the method described in Example 1 except that a mixture of bicycle[2.2.1]hept-2-ene-dicarboxylic acid dibutylester 2.5 g and diisopropyl 1,3-dimethoxypropane 1.8 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.2 wt %. Next, propylene polymerization was carried out by the same method as in Example 1, and the result was represented in Table 1.

Example 6

A catalyst was prepared according to the method described in Example 1 except that a mixture of bicycle[2.2.1]heptane-2,3-dicarboxylic acid dibutylester 2.5 g and diisopropyl 1,3-dimethoxypropane 1.8 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.3 wt %. Next, propylene polymerization was carried out by the same method as in Example 1, and the result was represented in Table 1.

Example 7

A catalyst was prepared according to the method described in Example 1 except that a mixture of bicycle[2.2.1]hept-5-ene-dicarboxylic acid dibutylester 2.5 g and diisopropyl 1,3-dimethoxypropane 1.8 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.1 wt %. Next, propylene polymerization was carried out by the same method as in Example 1, and the result was represented in Table 1.

Example 8

A catalyst was prepared according to the method described in Example 1 except that a mixture of bicycle[2.2.1]hept-2,5-diene-dicarboxylic acid dibutylester 2.5 g and diisopropyl 1,3-dimethoxypropane 1.8 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.2 wt %. Next, propylene polymerization was carried out by the same method as in Example 1, and the result was represented in Table 1.

Example 9

A catalyst was prepared according to the method described in Example 1 except that a mixture of bicycle[2.2.1]heptane-2,3-dicarboxylic acid dibutylester 2.5 g, diisopropyl 1,3-dimethoxypropane 0.9 g and diethyl 2,3-diisopropylsuccinate 1.1 g was used, instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.3 wt %. Next, propylene polymerization was carried out by the same method as in Example 1, and the result was represented in Table 1.

Example 10

A catalyst was prepared according to the method described in Example 1 except that a mixture of bicycle[2.2.1]hept-5-ene-dicarboxylic acid dibutylester 2.5 g, diisopropyl 1,3-dimethoxypropane 0.9 g and diethyl 2,3-diisopropylsuccinate 1.1 g was used, instead of a mixture of bicycle[2.2.1]hept-2-ene-dicarboxylic acid dibutylester 2.5 g and 9,9-bis (methoxymethyl)fluorene 2.1 g in the above item 1. Preparation of solid catalyst. The titanium content of the resulted solid catalyst component was 2.0 wt %. Next, propylene polymerization was carried out by the same method as in Example 1, and the result was represented in Table 1.

Comparative Example 1

1. Preparation of Solid Catalyst

To a 1 L-volume glass reactor of which atmosphere was sufficiently substituted by nitrogen, equipped with a stirrer, 150 ml of toluene, 12 ml of tetrahydrofuran, 20 ml of butanol and 21 g of magnesium chloride were added, and the temperature was raised to 110° C. and maintained for 1 hour, thereby obtaining a homogenous solution. The resulted solution was cooled to 15° C., then added with 25 ml titanium tetrachloride, and then, the reactor temperature was raised to 60° C. over 1 hour. After aging for 10 minutes, the mixture was stood still for 15 minute so as to precipitate the carriers, and the supernatant was removed. To the slurry remained in the reactor, 200 ml toluene was added, and stirring, allowing to stand still and removal of the supernatant was carried out twice for washing.

To the resulted slurry, 150 ml toluene was added, then 25 ml titanium tetrachloride diluted in 50 ml toluene was further added at 15° C. over 1 hour, and the reactor temperature was elevated to 30° C. at the speed of 0.5° C. per minute. The reaction mixture was maintained at 30° C. for 1 hour, 7.5 ml of diisobutylphthalate was added, and then its temperature was elevated to 110° C. at the speed of 0.5° C. per minute.

After maintaining the temperature at 110° C. for 1 hour and lowering to 90° C., stirring was halted, the supernatant was removed, and the resultant was washed once with additional 200 ml toluene in the same way. Thereto, 150 ml toluene and 50 ml titanium tetrachloride were added, and the temperature was raised to 110° C. and maintained for 1 hours for aging. After completion of the aging process, the mixed slurry was washed twice with 200 ml toluene for each washing, and then washed 5 times at 40° C. with 200 ml n-hexane for each washing, thereby obtaining a pale yellow solid catalyst component. The obtained catalyst component was dried for 18 hours under a nitrogen stream, and the titanium content in the resulted solid catalyst component was 3.3 wt %.

2. Polypropylene Polymerization

Polymerization was carried out according to the method described in Example 1 except using the above-obtained solid catalyst 10 mg, and the result was represented in Table 1.

Comparative Example 2

A catalyst was prepared according to the method described in Example 1 except that bicycle[2.2.1]heptane-2,3-dicarboxylic acid dibutylester 5.0 g was used instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 3.2 wt %. Next, propylene polymerization was carried out by the same method as in Example 1, and the result was represented in Table 1.

Comparative Example 3

A catalyst was prepared according to the method described in Example 1 except that diisopropyl 1,3-dimethoxy propane 3.6 g was used instead of a mixture of bicycle[2.2.1]hept-2-ene-dicarboxylic acid dibutylester 2.5 g and 9,9-bis(methoxymethyl)fluorene 2.1 g in the above item 1. Preparation of solid catalyst. The titanium content of the resulted solid catalyst component was 2.2 wt %. Next, propylene polymerization was carried out by the same method as in Example 1, and the result was represented in Table 1.

TABLE 1

|  | Activity (kg-PP/g-Cat) | Stereoregularity (X.I., wt. %) |
|---|---|---|
| Example 1 | 64 | 98.4 |
| Example 2 | 59 | 98.6 |
| Example 3 | 54 | 98.1 |
| Example 4 | 44 | 99.0 |
| Example 5 | 63 | 98.0 |
| Example 6 | 60 | 98.1 |
| Example 7 | 46 | 98.3 |
| Example 8 | 50 | 97.8 |
| Example 9 | 59 | 98.4 |
| Example 10 | 55 | 98.5 |
| Comp. example 1 | 26 | 97.3 |
| Comp. example 2 | 48 | 97.6 |
| Comp. example 3 | 29 | 98.6 |

As seen from the above Table 1, Examples 1-10 according to the present invention show excellent stereoregularity and catalyst activity, whereas Comparative example 1 shows significantly low activity and stereoregularity; Comparative example 2 shows significantly low stereoregularity; and Comparative example 3 shows lower activity as compared to the results of Examples according to the present invention.

INDUSTRIAL AVAILABILITY

By using the solid catalyst for propylene polymerization according to the present invention and a method for preparing polypropylene using the same, it is possible to prepare polypropylene having excellent stereoregularity with a high production yield.

What is claimed is:

1. A solid catalyst for propylene polymerization, wherein the solid catalyst comprises titanium, magnesium, halogen and an internal electron donor mixture of two or more compounds, wherein the internal electron donor mixture comprises at least one donor selected from bicycloalkane dicarboxylates or bicycloalkene dicarboxylates represented by formula (II), formula (III), formula (IV) or formula (V), and at least one donor selected from diether compounds represented by formula (VI) and succinate compounds represented by formula (VII):

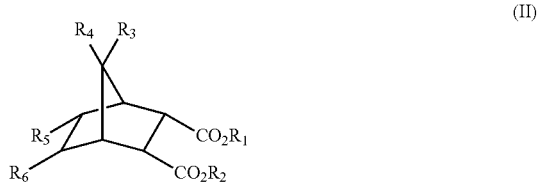

(II)

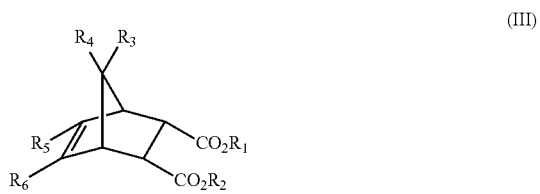

(III)

-continued

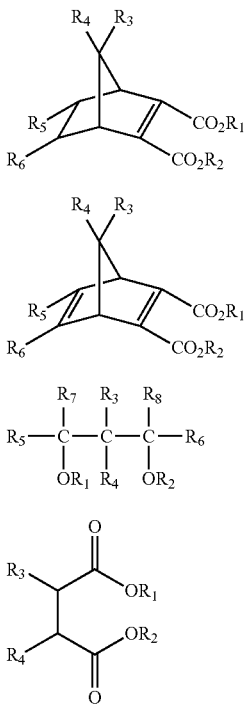

(IV)

(V)

(VI)

(VII)

wherein $R_1$ and $R_2$, which may be the same or different, are each a linear, branched or cyclic $C_{1-20}$ alkyl, alkenyl, aryl, arylalkyl or alkylaryl group; and respectively; $R_3$, $R_4$, $R_5$, $R_6$, $R_7$ and $R_8$, which may be the same or different, are each a hydrogen or a linear, branched or cyclic $C_{1-20}$ alkyl, alkenyl, aryl, arylalkyl or alkylaryl group.

2. The solid catalyst for propylene polymerization according to claim 1, comprising magnesium 5-40 wt %, titanium 0.5-10 wt %, halogen 50-85 wt % and the internal electron donor mixture 2.5-30 wt %.

3. A method for preparing polypropylene comprising polymerizing propylene or copolymerizing propylene with other alpha-olefins, in the presence of a solid catalyst according to claim 1, $AlR_3$, wherein R is $C_{1-8}$ alkyl group as a cocatalyst and $R^1{}_m R^2{}_n Si(OR^3)_{(4-m-n)}$, wherein $R^1$ and $R^2$, which are the same or different, are each a linear, branched or cyclic $C_{1-12}$ alkyl or aryl group; $R^3$ is a linear or branched $C_{1-6}$ alkyl group; m and n are 0 or 1, respectively, provided that m+n is 1 or 2, as an external electron donor.

4. Method for preparing polypropylene comprising polymerizing propylene or copolymerizing propylene with other alpha-olefins, in the presence of a solid catalyst according to claim 2, $AlR_3$, wherein R is $C_{1-8}$ alkyl group as a cocatalyst and $R^1{}_m R^2{}_n Si(OR^3)_{(4-m-n)}$, wherein $R^1$ and $R^2$, which are the same or different, are each a linear, branched or cyclic $C_{1-12}$ alkyl or aryl group; $R^3$ is linear or branched $C_{1-6}$ alkyl group; m and n are 0 or 1, respectively, provided that m+n is 1 or 2, as an external electron donor.

* * * * *